(12) United States Patent
Giordanetti

(10) Patent No.: US 10,295,842 B2
(45) Date of Patent: May 21, 2019

(54) SPECTACLES WITH CUSTOMIZABLE FRAME

(71) Applicant: Swatch AG, Biel/Bienne (CH)

(72) Inventor: Carlo Giordanetti, Zurich (CH)

(73) Assignee: Swatch AG, Biel/Bienne (CH)

( * ) Notice: Subject to any disclaimer, the term of this patent is extended or adjusted under 35 U.S.C. 154(b) by 0 days.

(21) Appl. No.: 15/554,245

(22) PCT Filed: Mar. 15, 2016

(86) PCT No.: PCT/EP2016/055606
§ 371 (c)(1),
(2) Date: Aug. 29, 2017

(87) PCT Pub. No.: WO2016/146643
PCT Pub. Date: Sep. 22, 2016

(65) Prior Publication Data
US 2018/0081200 A1    Mar. 22, 2018

(30) Foreign Application Priority Data

Mar. 19, 2015   (IT) .......................... 102015000009237
Apr. 27, 2015   (EP) ...................................... 15165282

(51) Int. Cl.
*G02C 9/04*   (2006.01)
*G02C 1/06*   (2006.01)

(52) U.S. Cl.
CPC .................. *G02C 9/04* (2013.01); *G02C 1/06* (2013.01); *G02C 2200/02* (2013.01);
(Continued)

(58) Field of Classification Search
CPC ...... G02C 2200/02; G02C 5/146; G02C 9/04; G02C 1/08; G02C 1/10; G02C 5/2254;
(Continued)

(56) References Cited

U.S. PATENT DOCUMENTS 2,887,008 A    5/1959   Gross
3,040,623 A    6/1962   Lauber
(Continued)

FOREIGN PATENT DOCUMENTS

| CA | 2082400 A1 | 9/1992 |
| FR | 2 870 012 A1 | 11/2005 |
| WO | 2006/043941 A1 | 4/2006 |

OTHER PUBLICATIONS

International Search Report dated Jul. 7, 2016 in PCT/EP2016/055606 filed Mar. 15, 2016.

*Primary Examiner* — Hung X Dang
(74) *Attorney, Agent, or Firm* — Oblon, McClelland, Maier & Neustadt, L.L.P.

(57) ABSTRACT

A spectacles includes a front element intended to be connected to two lateral temple arms, and at least one personalization element supporting the lenses and configured to be fixed removably on the front element by a complementary retainer. The complementary retainer includes, on the one hand, at least one stub which projects substantially perpendicularly from the rear face of the personalization element and, on the other hand, at least one slot, formed in the front element, the slot being designed to be deformed elastically so as to exert an elastic return force on the stub after introduction thereof into the slot in order to hold the personalization element on the front element.

14 Claims, 4 Drawing Sheets

(52) U.S. Cl.
CPC ..... *G02C 2200/04* (2013.01); *G02C 2200/08* (2013.01); *G02C 2200/12* (2013.01)

(58) Field of Classification Search
CPC .... G02C 7/086; G02C 7/088; G02C 2200/16; G02C 2202/08; G02C 5/16
USPC .................. 351/106, 103, 86, 83, 47, 57
See application file for complete search history.

(56) References Cited

U.S. PATENT DOCUMENTS

| | | | | |
|---|---|---|---|---|
| 4,685,782 | A | * | 8/1987 | Lhospice ................. G02C 1/04 351/130 |
| 5,943,114 | A | | 8/1999 | Grendelmeier |
| 6,786,593 | B2 | | 9/2004 | Zelman |
| 7,384,141 | B2 | * | 6/2008 | Zelman ................... G02C 9/00 351/140 |
| 2002/0097372 | A1 | | 7/2002 | Zelman |
| 2005/0243270 | A1 | | 11/2005 | Zelman |

\* cited by examiner

SPECTACLES WITH CUSTOMIZABLE FRAME

FIELD OF THE INVENTION

The invention relates to the field of spectacles, corrective glasses as well as sunglasses, and is aimed more particularly at personalisation of the spectacles by means of a decorative element.

BACKGROUND OF THE INVENTION

Combined spectacle solutions are known, in which the coupling means of the personalisation element with the front element provide the fitting of slugs which project from the personalisation element into corresponding recesses provided on the front element.

In order to ensure reciprocal retention between the coupled parts, it is known to provide coupling systems, for example by clamping, i.e. by elastic clamping, which however prove to be rather complex from the point of view of construction because of machining and the necessary components, or even do not prove to be particularly practical and convenient in assembly and disassembly operations of the personalisation element on the front element.

Some known solutions likewise require that the personalisation element or the front element must be deformed elastically in order to allow the correct relative positioning which guarantees their reciprocal holding.

SUMMARY OF THE INVENTION

The object of the invention is to provide spectacles which are easily personalisable, in particular without using a tool.

The object of the invention is likewise, at least in one particular embodiment, to provide personalisation of spectacles which is simple to implement and not particularly expensive.

These objects, and also others which will appear more clearly further on, are achieved according to the invention with the help of spectacles comprising a front element intended to be connected to two lateral temple arms, and at least one personalisation element supporting the lenses and configured to be fixed removable on the front element by means of complementary retaining means.

According to the invention, the complementary retaining means comprise, on the hand, at least one stub which projects substantially perpendicularly from the rear face of the personalisation element and, on the other hand, at least one slot, formed in the front element, the slot being designed to be deformed elastically so as to exert an elastic return force on the stub after introduction thereof into the slot in order to retain the personalisation element on the front element.

According to a preferred embodiment of the invention, the complementary retaining means comprise an elastic strip in a C shape in the slot, the elastic strip comprising a first branch integral with the front element, and a second free elastic branch.

According to other advantageous variants of the invention:
- the second free elastic branch is designed to be deformed in the plane of the front element;
- the slot comprises a clearance which facilitates deformation of the elastic strip in the plane of the front element;
- the opening is into a keyhole shape, i.e. a trapezoidal base surmounted by a circle, the height of the trapezoidal base forming a narrower passage so as to form a hard point during passage of the stub into the opening;
- the diameter of the circle of the opening is substantially identical to the diameter of the stub;
- the personalisation element comprises at least one gutter provided with a groove which opens at the top, disposed in an upper zone of the personalisation element, the groove being configured to receive all or part of the front element;
- the gutter comprises a layer of elastically deformable material disposed on the bottom of the groove;
- the front element is formed form a single part which is cut out and folded;
- the front element is produced from a ferromagnetic material and the stub is produced in a magnetic material so as to reinforce holding of the personalised element in position against the front element;
- the stub comprises a stem attached to the personalisation element, the stem ending with a radial bulge, and the length of the stem being substantially identical to the thickness of the front element;
- the stub is integral with the personalisation element;
- the slot comprises a pair of elastic strips produced with a mirror-like symmetry relative to a median plane of symmetry of the corresponding slot directed transversely relative to the front element;
- the front element and the elastic strip have the same thickness;
- the front element (2) is produced in plastic material.

BRIEF DESCRIPTION OF THE DRAWINGS

Other features and advantages of the invention will appear more clearly upon reading the following description of a particular embodiment of the invention, given by way of simple example which is illustrative and non-limiting, and of the annexed Figures, in which.

DETAILED DESCRIPTION OF PREFERRED EMBODIMENTS

Figure 1:
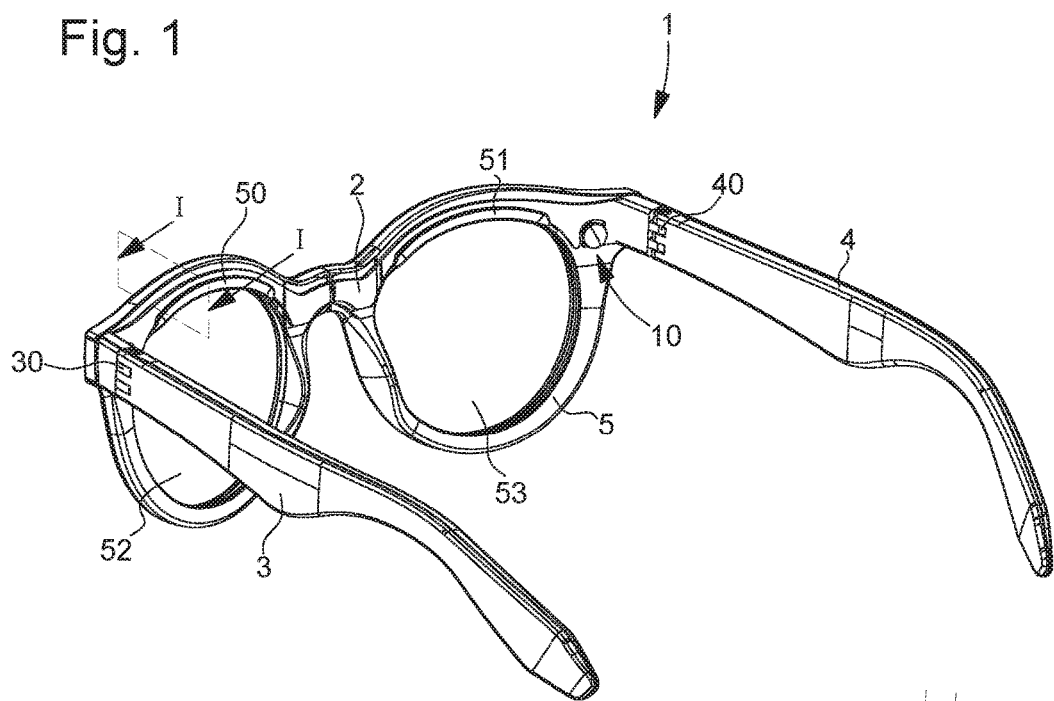
FIG. 1 is a perspective view of a pair of spectacles according to the invention.
Figure 4:
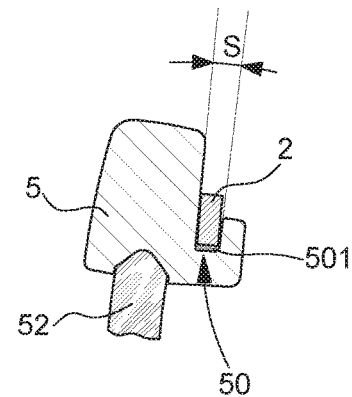
FIG. 4 is a sectional view along the line I of the spectacles illustrated in FIG. 1.

A pair of spectacles according to the invention will now be described in the following, with reference jointly to FIGS. 1, 2, 3a, 3b, 4, 5a to 5c, 6a and 6b.

The invention relates to spectacles 1 comprising a front element 2 formed by a bridge 23 which is intended to be connected to two lateral temple arms 3 and 4 by means of corresponding hinges 30 and 40. The spectacles 1 likewise comprise a personalisation element 5 which is configured to be fixed removably on the front element 2 by means of complementary retaining means.

The complementary retaining means comprise, on the one hand, at least one stub 10 which projects substantially perpendicularly from the rear face of the personalisation element 5 and, on the other hand, at least one slot 20, formed in the front element 2, the slot 20 being designed to be deformed elastically so as to exert an elastic restoring force on the stub 10 after introduction thereof into the slot 20 in order to retain the personalisation element 5 on the front element 2.

According to a first embodiment of the invention, a stub 10 is disposed at the level of the left upper corner and of the right upper corner of the rear face of the personalisation element 5, each stub 10 being configured to cooperate with a respective slot 20 disposed at each end of the front element 2.

According to a preferred embodiment of the invention, illustrated in the Figures, the complementary retaining means comprise an elastic strip 21 in a C shape in the slot 20, the elastic strip 21 comprising a first branch 210 integral with the front element 2, and a second free elastic branch 211.

Advantageously, the second free elastic branch 211 is designed to be deformed in the plane of the front element. Furthermore, the slot 20 comprises a clearance 22, around the elastic strip 21, in order to facilitate deformation of the elastic strip 21 when the stub 10 is introduced into the slot 20.

The front element 2 can be formed in a single part which is cut out then folded in order to shape it, and can be produced from a metal sheet or strip. A stamping operation is likewise conceivable in order to obtain the front element 2, from a metallic sheet of low thickness S.

Figure 2:
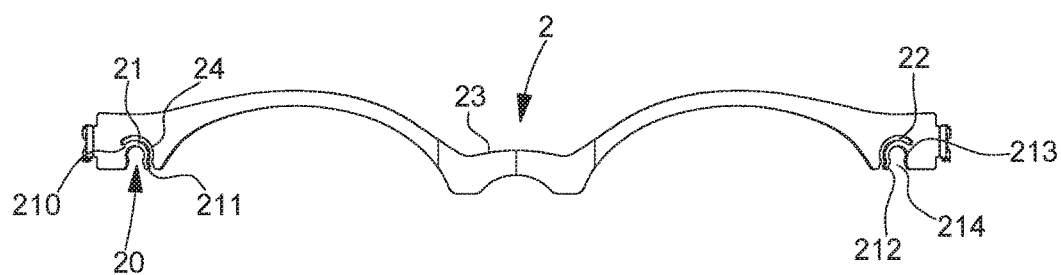
FIG. 2 is a front view of a front element according to the invention.

As can be seen in FIG. 2, the elastic strip 21 partially surrounds the slot 20 so as to form a narrower passage than the stub 10 and to retain the stub 10 in the slot 20 when the personalisation element 5 is mounted on the front element 2 according to a vertical plane parallel to the personalisation element for example. Thus, fixing the personalisation element 5 on the front element 2 can be achieved from top to bottom or from bottom to top according to the position of the slot 20.

According to the invention, the stub 10 is connected to the personalisation element 5 and has, in the direction of its length, a mushroom shape. The stub 10 comprising a stem 11, or a substantially cylindrical foot, extending from the personalisation element 5, which projects from this personalisation element along an axial direction Z and which ends with a radial bulge 12, or a head enlarged relative to the stem 11.

Figure 6A:
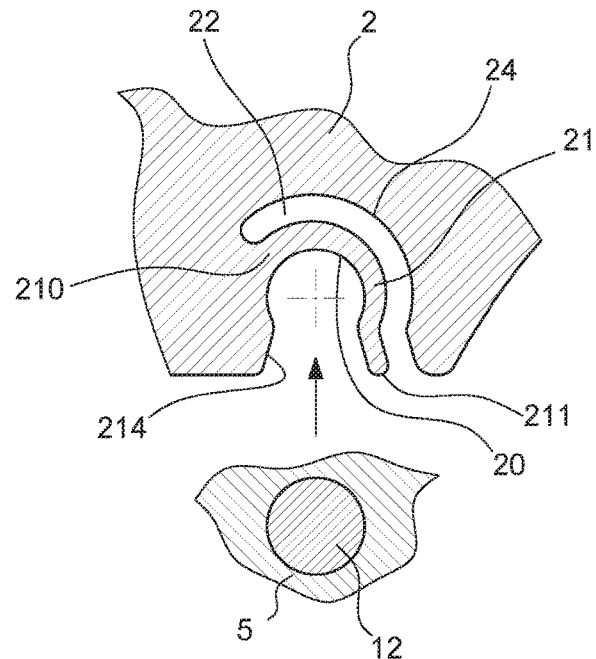
FIG. 6a is a detailed view of a retaining means according to the invention according to a first embodiment.

Preferably, the stubs 10 are obtained from a single part with the personalisation element 5, the latter being able to be produced in plastic material for example As represented in FIG. 6a, the slot 20 is in the form of a keyhole, i.e. a trapezoidal base 212 surmounted by a circle 213, the top of the trapezoidal base 212 forming a narrower passage so as to form a hard point when the stem 11 of the stub 10 goes into the slot 20. Each slot 20 likewise has an opening 214 produced at the level of the trapezoidal base 212 for passage of the stub 10.

The curved shape of the elastic strip 21 is chosen such that this profile can surround, with a coupling of a substantial shape, the stem 11 of the stub 10 when the latter is inserted into the slot 20 at the end of coupling between the front element 2 and the personalisation element 5.

Advantageously, the diameter of the circle 213 is substantially identical to the diameter of the stem 11 of the stub 10. Likewise, the length of the stem 11 of the stub 10 is chosen advantageously to be equal, at least with a reduced dimensional tolerance, to the thickness S of the front element 2, so that, in the coupling condition of the stub with the slot 20, a stable axial retention of the personalisation element 5 is guaranteed.

As can be seen in FIG. 2, the clearance 22 defines the possible bottoming of the elastic strip 21, the front element 2 having a contact surface 24 playing the role of limit stop so that the flexible strip 21 does not exceed its elastic deformation limit.

Thanks to this arrangement, each elastic strip 21 is displaced from its state of rest in the plane of the front element 2 to passage of the stem 11 of the stub 10 until the stem 11 passes the hard point and is put in the circle 213, each elastic strip 21 taking back its state of rest again once the stem 11 is put in the circle 213, the stub 10 then being retained in place in the slot 20.

During introduction, the stem 11 of the stub 10 interferes, in correspondence with the opening 214, with the second free elastic branch 211 of the elastic strip 21, this movement causing an elastic spreading of the elastic strip 21 with a successive return into the coupling shape condition with the stem 11 when the latter is completely received in the circle 213 of the slot 20.

Obviously, other forms are conceivable for the complementary retaining means.

The thickness S of the front element 2 is provided to be smaller than or equal to the length of the stem 11 of the stub 10 in order to facilitate fixing the personalisation element 5 on the front element 2. Furthermore, the radial bulge 12 of the stub 10 can form a limit stop according to the axial direction Z of the stub 10 so as to prevent the personalisation element 5 from sliding along the stem 11 of the stub 10 and becoming free from the front element 2.

Figure 6B:
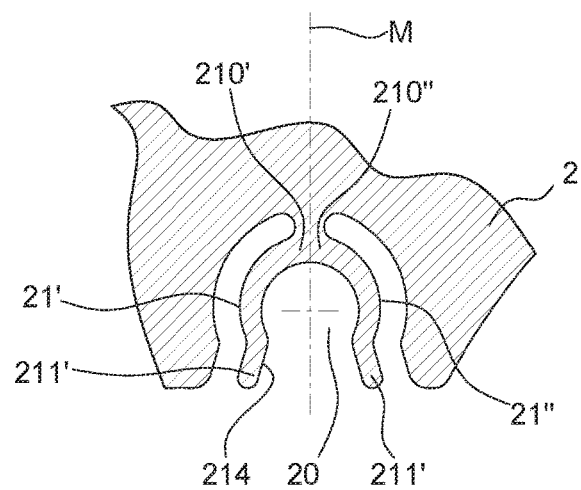
FIG. 6b is a detailed view of a retaining means according to the invention according to a second embodiment.

According to another embodiment of the invention, illustrated in FIG. 6b, it is provided that, in each of the slots 20, a pair of elastic strips 21' and 21" is housed, with a mirror-like symmetry between each other relative to a transverse median plane of the slot (the intersection of which with the front element 2 is marked with the axial direction M indicated in FIG. 6b). The elastic strips 21' and 21" are provided in order to delimit, jointly with the front element 2, the slot 20 intended to receive the stub 10.

Each elastic strip 21', 21" has a curved profile, substantially analogous to that of the elastic strip 21, and each comprising a first branch 210', 210" integral with the front element 2, and a second free elastic branch 211', 211". Thus, the free elastic branches 211', 211" form the opening 214 produced at the level of the trapezoidal base 212.

Introduction of the stem 11 of the stub 10 into the slot 20 is effected with elastic spreading of the elastic strips 21' and 21" (by one being moved away from the other) with successive elastic return into the coupling condition in which the elastic strips surround, by coupling with the shape of the cylindrical stem 11 of the stub 10, the elastic strips 21' and 21" exerting an elastic stress against the stem 11 of the stub 10 when the latter is received in the slot 20.

According to a particular embodiment of the invention, the personalisation element 5 comprises at least one gutter 50 provided with a groove 500 opening at the top. The gutter 50 is disposed in the upper zone of the personalisation element 5, above lenses 52, 53 for example, and is configured to receive all or part of the front element 2. The groove 500 has a slightly larger width than the thickness of the front element 2 in order to ensure good retention of the personalisation element 5 on the front element 2.

There is intended by upper zone of the personalisation element 5, the zone situated at the top when the spectacles are in the worn position.

Figure 3A:
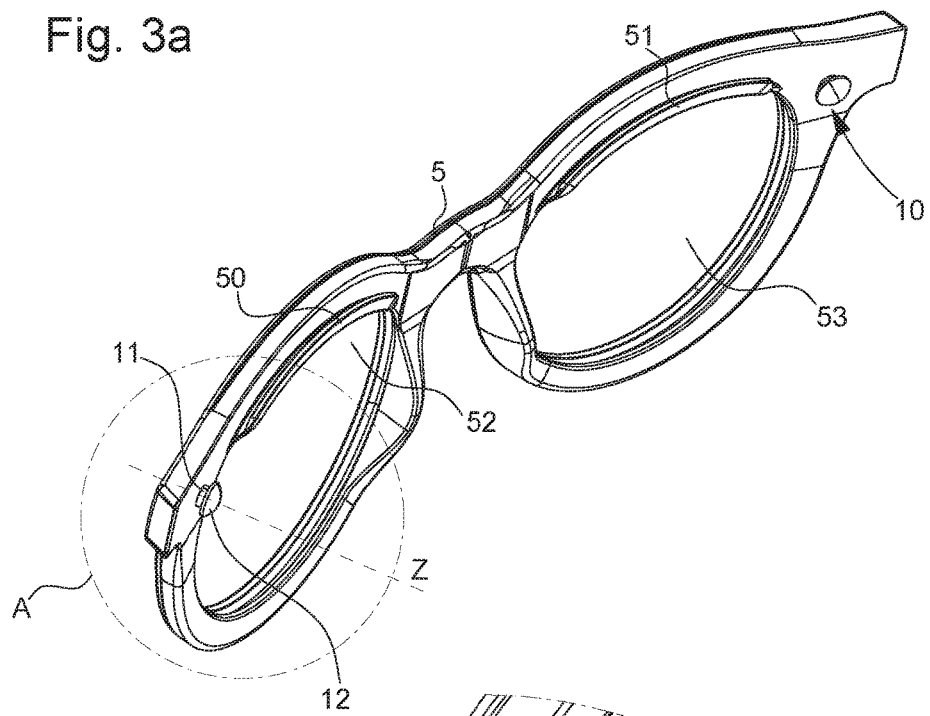
FIGS. 3a and 3b are, respectively, a perspective view of a personalisation element and a detailed view of a retaining means according to the invention.
Figure 3B:
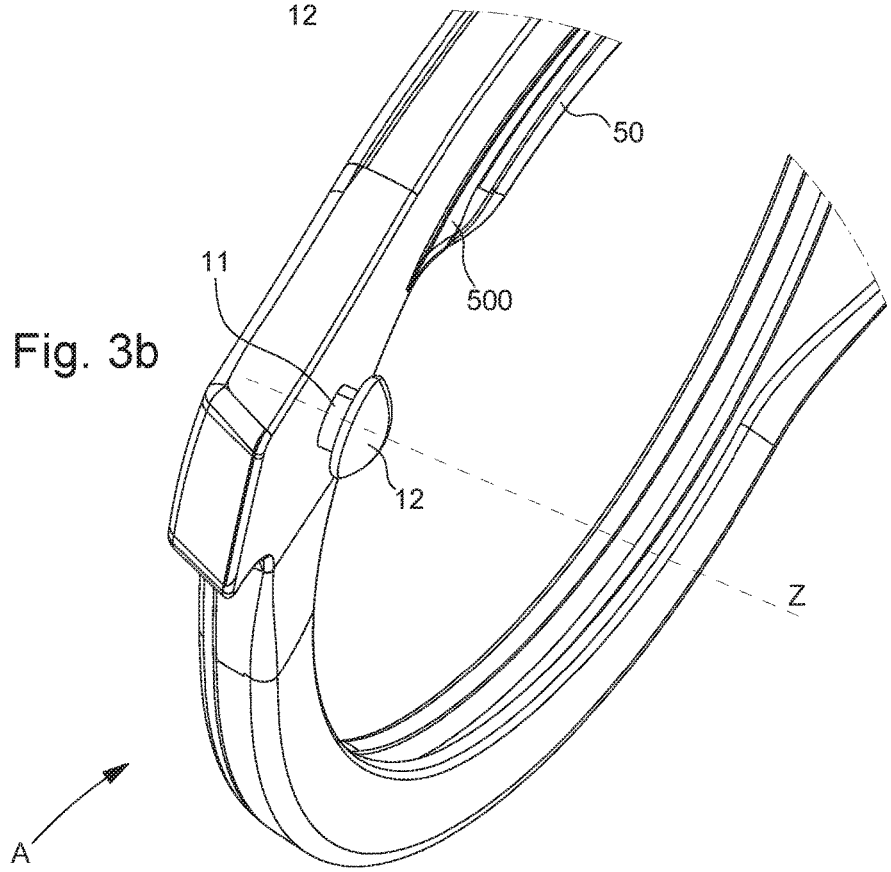
Figure 5A:
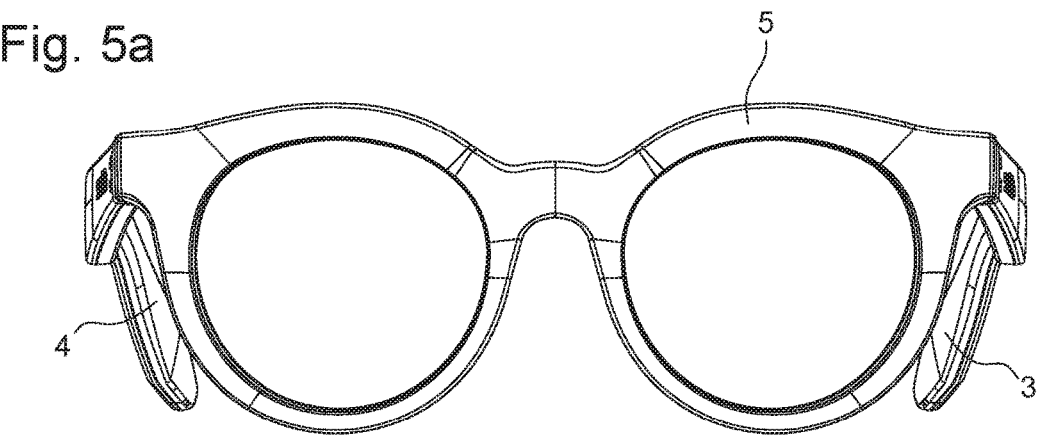
FIGS. 5a to 5c illustrate the various forms of the personalisation element according to the invention.
Figure 5B:
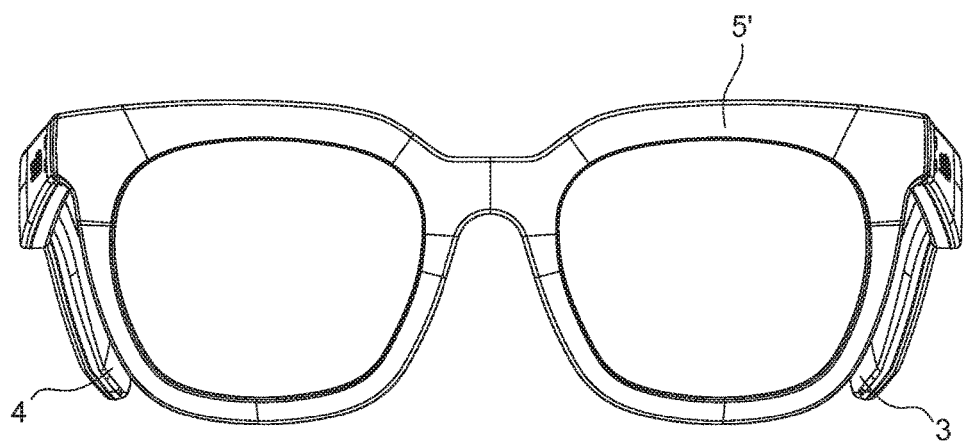
Figure 5C:
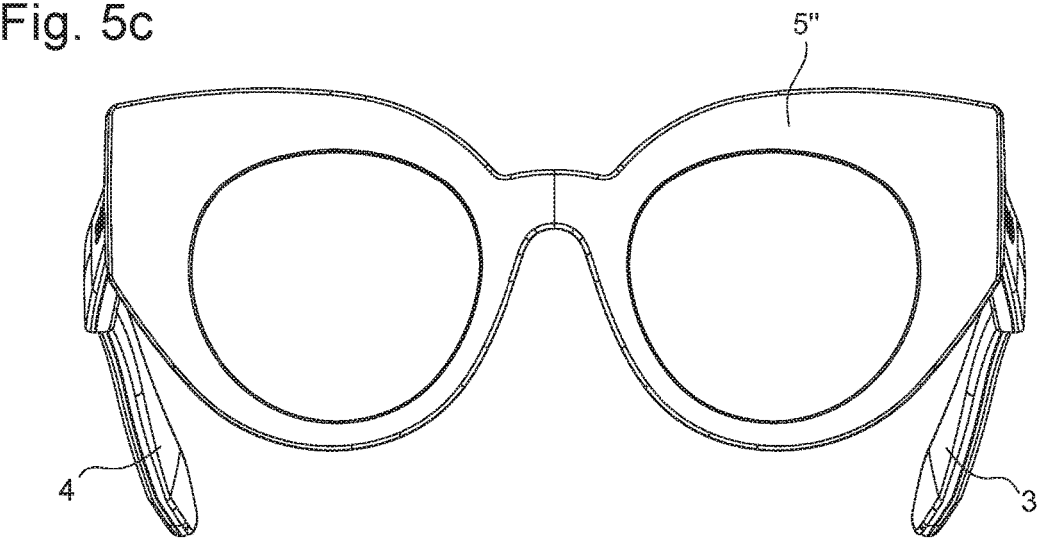

As can be seen in FIG. 3a, the personalisation element 5 comprises a gutter 50 disposed above each lens 52 and 53. A continuous gutter extending over all or part of the length of the personalisation element 5 is likewise conceivable.

As can be seen in FIG. 5, it can be provided to dispose an elastically deformable material 501, such as for example an elastomeric material, at the bottom of the groove 500 of the gutter or gutters 50, 51, in order to fill any possible play after fixing the personalisation element 5 on the front element 2.

Again according to an additional embodiment, the front element 2 is produced from a ferromagnetic material and the stub 10 is produced in a magnetic material and is fixed to the personalisation element 5. According to this embodiment, the front element 2 and also the locking means are produced in a metallic material, such as iron, cobalt, nickel or one of the alloys thereof, so as to reinforce holding of the personalisation element 5 in position against the front element 2. This embodiment likewise has the advantage of allowing holding of the personalisation element 5 against the front element 2 in the case where the elastic strip 21 might break.

Thanks to these various aspects of the invention, there is available a pair of spectacles 1 of a simple design which allows rapid and easy personalisation. Such personalisation examples can be seen in FIGS. 5a, 5b and 5c.

Similarly, the invention is likewise applicable to frontal frames with ring with a partially open and also supporting profile, if required, nose pads separate from the ring and applied appropriately on the latter.

Of course, the present invention is not limited to the illustrated example and is able to have various variants and modifications which will be obvious to the person skilled in the art.

NOMENCLATURE 1. spectacles
10. stub
11. stem of the stub
12. radial bulge of the stub
2. front element
20. slot
21, 21', 21". elastic strip
210, 210', 210". first branch
211, 211', 211". second elastic branch
212. trapezoidal base
213. circle
214. opening
22. clearance
23. bridge
24. contact surface
3, 4. Temple amrs
30, 40. hinges
5, 5', 5". personalisation element
50, 51. gutters
500. groove
501. elastically deformable material layer
52, 53. lenses
M. axial direction
S. thickness of the front element
Z. axial direction of the stub

The invention claimed is:

1. A spectacles comprising:
a front element intended to be connected to two lateral temple arms; and
at least one personalisation element supporting lenses and configured to be fixed removably on the front element by a complementary retainer,
wherein the complementary retainer includes at least one stub which projects substantially perpendicularly from a rear face of the personalisation element and at least one slot formed in the front element,
wherein the slot is configured to be deformed elastically so as to exert an elastic return force on the stub after introduction thereof into the slot in order to hold the personalisation element on the front element, and
wherein the slot includes an elastic strip in a C shape, the elastic strip includes a first branch integral with the front element, and a second free elastic branch spaced apart from the front element.

2. The spectacles according to claim 1, wherein the second free elastic branch is designed to be deformed in the plane of the front element.

3. The spectacles according to claim 1, wherein an opening of the slot has the shape of a keyhole, including a trapezoidal base surmounted by a circle, the height of the trapezoidal base forming a narrower passage so as to form a hard point during passage of the stub into the opening.

4. The spectacles according to claim 3, wherein the diameter of the circle of the opening is substantially identical to the diameter of the stub.

5. The spectacles according to claim 1, wherein the slot comprises a clearance which facilitates deformation of the elastic strip in the plane of the front element.

6. The spectacles according to claim 1, wherein the personalisation element comprises at least one gutter provided with a groove which opens at the top, disposed in an upper zone of the personalisation element, the groove being configured to receive all or part of the front element.

7. The spectacles according to claim 6, wherein the gutter comprises a layer of an elastically deformable material disposed on the bottom of the groove.

8. The spectacles according to claim 1, wherein the front element is formed from a single part which is cut out and folded.

9. The spectacles according to claim 1, wherein the front element is produced from a ferromagnetic material and the stub is produced in magnetic material so as to reinforce holding of the personalisation element in position against the front element.

10. The spectacles according to claim 1, wherein the stub comprises a stem attached to the personalisation element, the stem ending with a radial bulge, and the length of the stem being substantially identical to the thickness of the front element.

11. The spectacles according to claim 1, wherein the stub is integral with the personalisation element.

12. The spectacles according to claim 1, wherein the slot comprises a pair of elastic strips produced with a mirror-like symmetry relative to a median plane of symmetry of the corresponding slot directed transversely relative to the front element.

13. The spectacles according to claim 1, wherein the front element and the elastic strip have the same thickness.

14. The spectacles according to claim 1, wherein the front element is produced in plastic material.

* * * * *